United States Patent [19]
Anabuki et al.

[11] Patent Number: 5,693,893
[45] Date of Patent: Dec. 2, 1997

[54] STRIP SHAPE DETECTING APPARATUS

[75] Inventors: Yoshinori Anabuki, Kurashiki; Shunji Harada; Masahiro Hamamatsu, both of Nishinomiya, all of Japan

[73] Assignees: Kawasaki Steel Corp.; Kawatetsu Advantech Co., Ltd., both of Hyogo, Japan

[21] Appl. No.: 757,166

[22] Filed: Nov. 27, 1996

[30] Foreign Application Priority Data

Nov. 27, 1995 [JP] Japan ................. 7-307555

[51] Int. Cl.⁶ .................. G01L 5/04; G01N 3/08
[52] U.S. Cl. .................. 73/862.07; 73/826
[58] Field of Search .................. 73/828, 37.5, 37.6, 73/37.7, 862.07, 159, 160

[56] References Cited

U.S. PATENT DOCUMENTS

| | | | |
|---|---|---|---|
| 3,413,846 | 12/1968 | Flinth | 73/862.07 |
| 3,557,614 | 1/1971 | Muhlberg | 73/862.07 |
| 4,024,755 | 5/1977 | Quehen | 73/862.07 |
| 4,428,244 | 1/1984 | Takeda | 73/862.07 |
| 4,561,313 | 12/1985 | Habermann et al. | 73/862.07 |
| 4,939,936 | 7/1990 | Spooner et al. | 73/862.07 |

*Primary Examiner*—Elizabeth L. Dougherty
*Assistant Examiner*—Max H. Noori
*Attorney, Agent, or Firm*—Oliff & Berridge

[57] ABSTRACT

A strip detecting apparatus comprising a plurality of measurement rings axially arranged around an outer circumference of a fixed shaft, characterized by a floating inner ring fitted to the fixed shaft via a load cell and an outer ring externally fitted to an outer circumference of the floating inner ring so as to rotate freely. A cell portion containing a strain gauge sealed with an inert gas in a load cell is arranged with a cooling means to detect a shape of a high-temperature strip.

4 Claims, 7 Drawing Sheets

STRIP SHAPE DETECTING APPARATUS

BACKGROUND OF THE INVENTION

1. Field of the Invention

The present invention relates to a shape detecting apparatus for measuring a shape of a strip by measuring a tension distribution online in a strip width direction of the strip, wherein the strip is traveling continuously. More particularly, the present invention relates to a shape detecting apparatus used in a high-temperature atmosphere such as in a hot strip rolling mill.

2. Related Background Art

In a technique for measuring a shape of a strip such as the flatness in a strip width direction, wherein the strip is traveling continuously, a method of measuring a tension distribution is generally employed. Therein, the tension distribution is measured in the strip width direction which is generated when a tension is added to the strip. The measured tension distribution in the strip width direction is considered a shape distribution in the strip width direction.

In this type of technique for measuring the tension distribution in the strip width direction, various methods have been proposed. These include a technique of incorporating a load detector into a plurality of divided rolls arranged in a direction corresponding to a traveling strip width and fitted to a fixed shaft, a technique of measuring a frequency of vibration or a displacement distribution in the strip width direction by supplying a forced vibration to the strip from the outside, and a technique of measuring a grating space by means of an X-ray diffraction and utilizing a change of the grating space caused by an internal stress.

Figure 7:
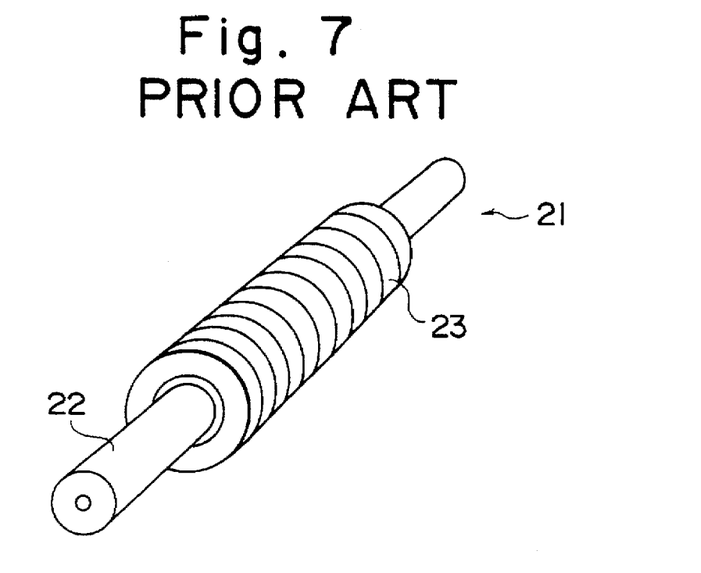
FIG. 7 is an entire perspective view of a conventional shape detecting apparatus.

With regard to the technique of incorporating the load detector into the divided rolls fitted to the fixed shaft, various approaches of the technique have been put to practical use since its principle was proposed in Japanese Unexamined Patent Publication (Kokai) No. 49-120665. A common concept is to arrange the divided rolls containing a load detecting mechanism for detecting a vertical component of a tension in a strip width direction in order to measure a tension distribution in the strip width direction. Based on this principle, there are conventionally proposed various rotary divided rolls as shown in FIGS. 7 to 11. FIG. 7 is an entire perspective view of a conventional shape detecting apparatus 21 including divided rolls 23.

Figure 8:
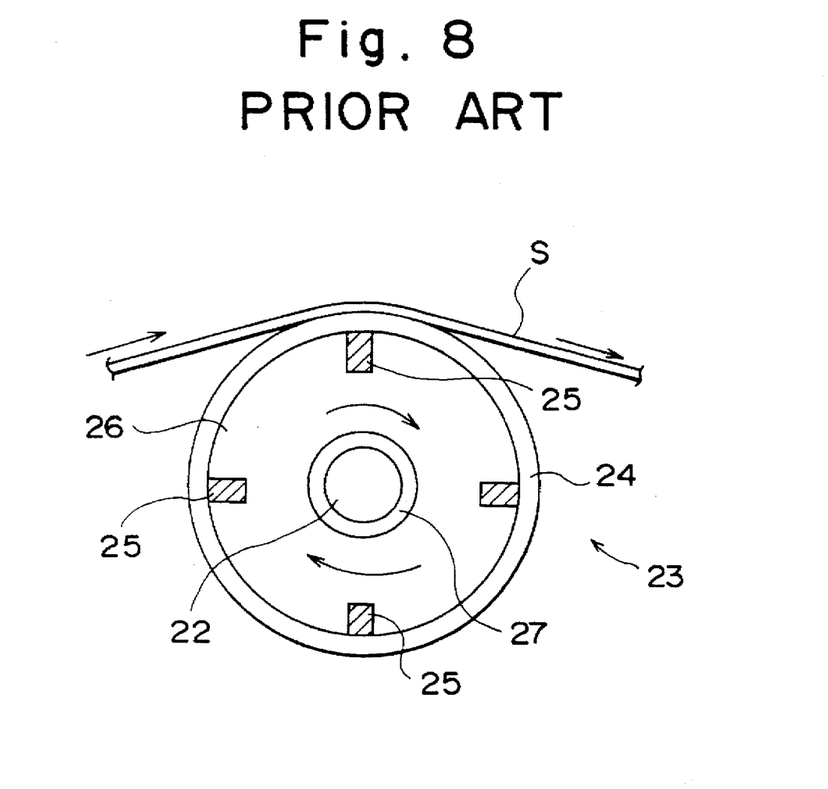
FIG. 8 is an elevational section view of a divided roll of a conventional shape detecting apparatus.

FIG. 8 shows an example of four load cells 25 for detecting loads at 90° intervals incorporated into a steel core 26 and integrated into a sleeve 24 on an outer circumference of a divided roll 23. In this manner the four load cells 25 detect loads of a strip S sequentially with a rotation of the steel core 26. In this case, a load detecting signal from each load cell 25 is output to the outside via a slip ring 27 installed outside the derided rolls positioned at the both ends of an arrangement of derided rolls 23. The load detecting signal is not continuously output, but it is fetched as a discontinuous signal every ¼ rotation of the steel core 26 corresponding to the load cells 25.

Figure 9:
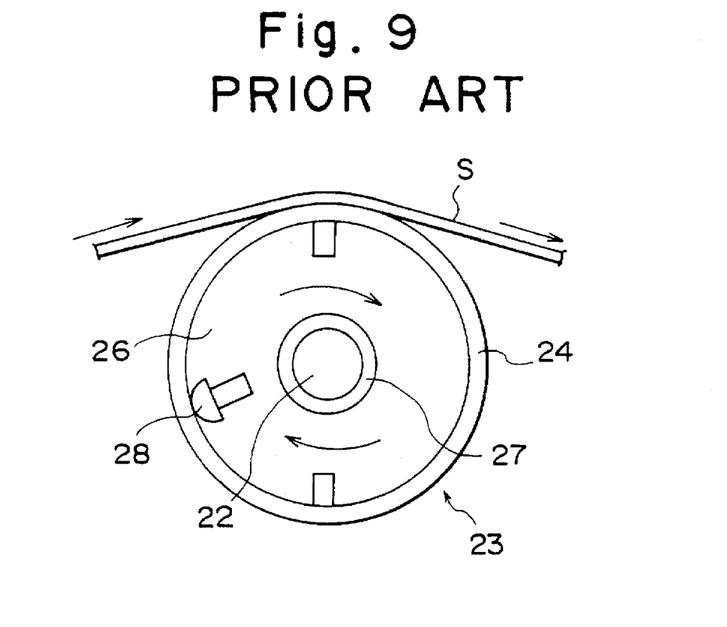
FIG. 9 is an elevational section view of a divided roll of another conventional shape detecting apparatus.

FIG. 9 shows an example of a divided roll 23 having the same basic structure as one shown in FIG. 8, except that a piezo-electric element 28 for detecting a load is incorporated into the surface of the steel core 26. Although a load signal is fetched from the piezoelectric element 28 in the same manner as for one in FIG. 8, in this example, one signal is fetched only once every rotation of the sleeve 24.

Figure 10:
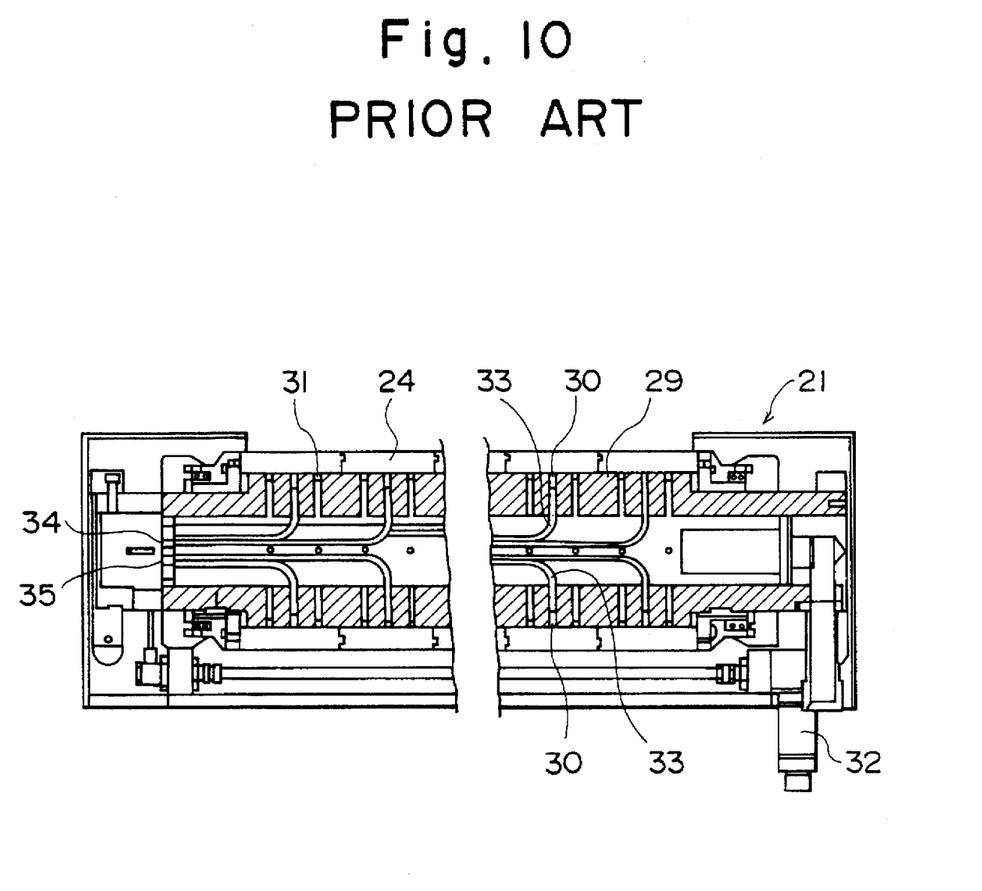
FIG. 10 is a sectional side view of another conventional shape detecting apparatus.

FIG. 10 shows an example of a shape detecting apparatus 21 in which a measurement ring having an air bearing structure is applied. A sleeve 24 is fitted around a bearing 29, having a structure that the sleeve 24 and the bearing 29 are held at a given distance from each other by blowing compressed air, introduced from an air inlet 32 against an inside wall of the sleeve 24 through many outlets 31 from the inside of the bearing 29. A load generated by a strip tension applied on the surface of the sleeve 24 is taken out to the outside from air pressure detecting ports 30 opposing each other at an angle of 180° in a vertical direction through each air pressure detecting conduit 33 and an upper air outlet 34 or a lower air outlet 35 as a gap between upper and lower air bearings of the bearing 29, that is, an air pressure difference, and then detected as its differential pressure.

Figure 11:
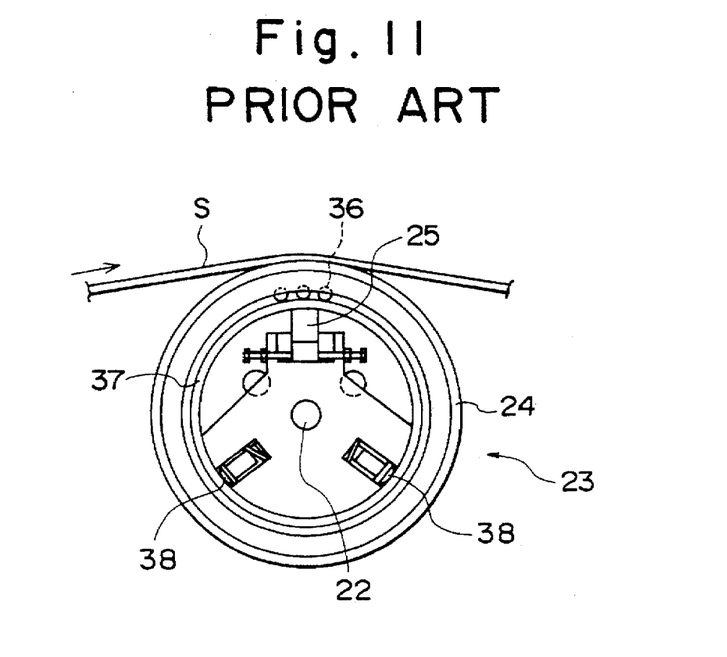
FIG. 11 is an elevational section view of a divided roll of another conventional shape detecting apparatus.

FIG. 11 illustrates a structure of the divided roll 23 proposed in Japanese Unexamined Patent Publication (Kokai) No. 4-262812, whose object is to measure a shape of a high-temperature strip S, particularly of a hot rolled strip. This apparatus detects a vertical load caused by a strip tension by means of a load cell 25 through an inner ring 37 inside a bearing 36 fitted on an inner surface of a sleeve 24. A fluctuation of the load caused by a thermal expansion of the entire apparatus is offset by controlling a pressure adjusting device 38 for applying a given pre-load to the load cell 25.

Techniques of measuring a vibration frequency or a displacement distribution in a width direction by giving a forced vibration from the outside to a strip are proposed in Japanese Unexamined Patent Publication (Kokai) 6-43051 or Japanese Unexamined Patent Publication (Kokai) No. 6-249725. These techniques calculate a tension distribution in a strip width direction by causing a vibration from blowing a high-pressure compressed air against a strip and measuring an amplitude or a frequency of the vibration by using a plurality of distance measuring devices set in the strip width direction.

When measuring a shape of a strip rolled by a hot rolling mill, particularly at a temperature of 250° C. or higher several problems associated with the conventional device and methods become apparent. These problems include the following.

In the systems shown in FIGS. 8 and 9, the load cell 25, the piezo-electric element 28, or other load detector is integrated into a steel core 26 embedded at the surface of the core. This results in a problem from a heat resistance viewpoint if the detector is directly brought into contact with a strip at a high temperature at measuring. Although the heat resistance temperature upper limit of these load detectors is generally 200° C., an actual upper limit of use from a practical standpoint is 180° C. In addition, these techniques require fetching an output from each divided roll via the slip ring 27 and also need a motor for driving the roll. This leads to problems concerning maintaining the system. Furthermore, load detectors are discontinuously arranged on an outer circumference of the steel core in these techniques and therefore a detection output is necessarily discontinuous, which leads to complicated signal processing for obtaining a shape distribution.

In the technique shown in FIG. 10, a continuous output is obtained and signal processing from a detector is easy since a detecting section is air bearing and fixed to the fixed shaft side. It, however, has a problem that a compressed air is expanded due to heat dissipation from a strip when measuring a shape of the strip, particularly at a high temperature, since a fine fluctuation of an air pressure affects a result of the measurement significantly due to an air bearing structure. Additionally, this structure has as small as tens of kilograms of a resistance to load per measurement ring since an air bearing is adopted and therefore it is impossible to use the structure to measure a shape of a strip to be rolled with a high tension.

Although a basic concept of the technique shown in FIG. 11 is the same as for the technique shown in FIG. 10, a normal bearing is used instead of an air bearing and a load cell is arranged for each divided roll for detecting a load. Therefore signal processing is easy and the load cells can be cooled down so as to endure a high temperature. It, however, requires accounting for and cancellation of a fluctuation caused by a thermal expansion. This is accomplished by adjusting a pressure of a spring, due to an adopted structure that a given pre-load is always applied to the load cells by an adjusting device such as a spring; hence a structure of the divided roll is complicated and the measured value becomes inaccurate.

As for the technique of calculating a tension distribution of a strip based on a frequency component of a vibration given to the strip, there is a possibility that a measured value becomes inaccurate due to effects of a temperature distribution or the like in a strip width direction.

SUMMARY OF THE INVENTION

The invention therefore provides an apparatus for detecting and measuring a shape of a continuously traveling strip.

The invention further provides an apparatus for detecting and measuring a shape of a continuously traveling strip by measuring a tension distribution in a width direction of the strip.

The invention further provides an apparatus for detecting and measuring a shape of a continuously traveling strip in a high temperature atmosphere such as a hot strip rolling mill.

The present invention provides these and other features in an apparatus having a plurality of measurement rings which are axially arranged around an outer circumference of a fixed shaft. The apparatus further includes a floating inner ring fitted to the fixed shaft via a load cell and an outer ring externally fitted to the outer circumference of the floating inner ring so as to rotate freely.

In addition, this invention includes a cell having a strain gauge in a central portion of the load cell wherein the gauge is sealed with an inert gas. The present invention further includes an external cooling means arranged in the load cell.

A more complete understanding of the present invention can be obtained by considering the following detailed description in conjunction with the accompanying drawings, wherein like index numerals indicate like parts.

DETAILED DESCRIPTION OF THE PREFERRED EMBODIMENTS

A shape detecting apparatus of this invention comprises a plurality of measurement rings. These measurement rings each have a configuration of an entire ball bearing considered as if it is a load cell structure with an inner race of the ball bearing fastened to a fixed shaft via a load cell.

In other words, the shape detecting apparatus is integrated into the fixed shaft by arranging a plurality of measurement rings in a strip width direction each having an outer ring arranged so as to rotate freely around the outer circumference of a floating inner ring which shapes an outer circumference portion of a load cell.

An operation of this invention are described below in further detail.

Since the entire inner ring is a load cell structure, a load detector is not directly brought into contact with a strip and it does not require compensation for fluctuations of a load caused by thermal expansion. Hence a shape can be measured stably in a simple structure. It is also possible to measure a shape of a strip not only in the normal temperature region but also at temperatures of 250° C. or higher. Furthermore, it is also possible to measure a shape of a hot rolled strip at a high temperature by arranging a strain gauge, which has been put into a cell portion sealed with an inert gas such as $N_2$, at the central portion of the load cell and then cooling the outside of the cell portion by means of a cooled air.

In addition, an output from the detector is continuous and a signal processing circuit is simple. Since the detection output can be fetched from a spatially-fixed inner ring, a slip ring like a conventional one is unnecessary, which leads to a good maintainability. Further, since an outer ring is used as an external ring rotating freely being fitted via balls for each measurement ring, a driving motor like a conventional one is unnecessary and therefore it allows for a shape detecting apparatus which has a simple structure and a low cost.

Figure 1:
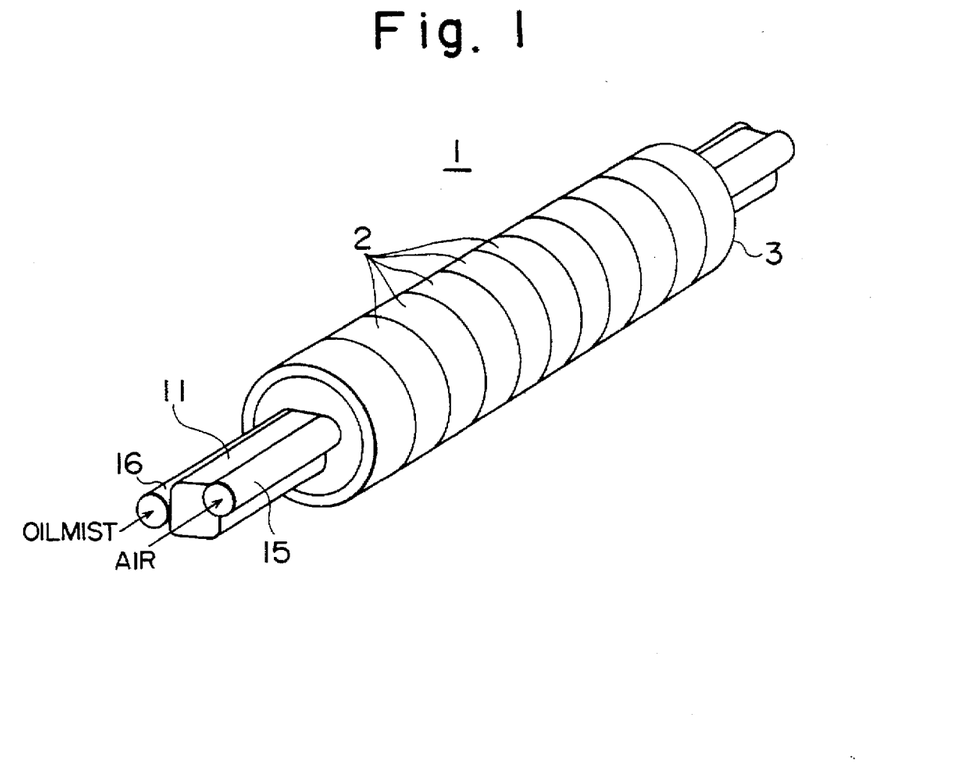
FIG. 1 is an entire perspective view of an embodiment of a shape detecting apparatus of the present invention.
Figure 2:
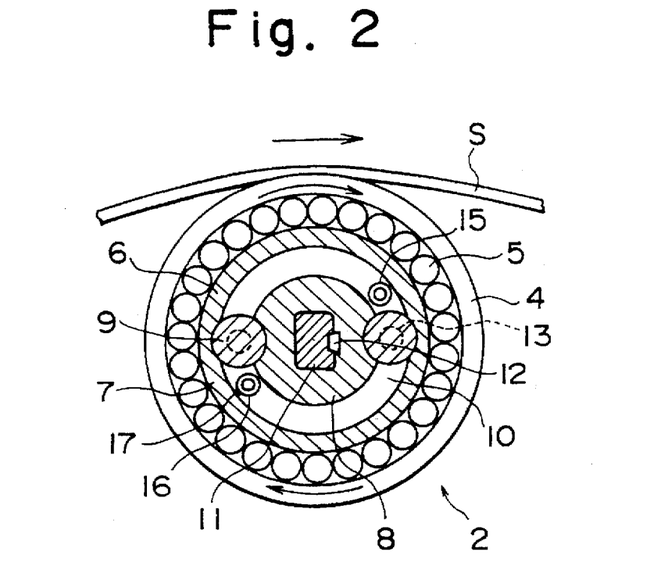
FIG. 2 is an elevational section view of an embodiment of a measurement ring of the shape detecting apparatus of the present invention.
Figure 3:
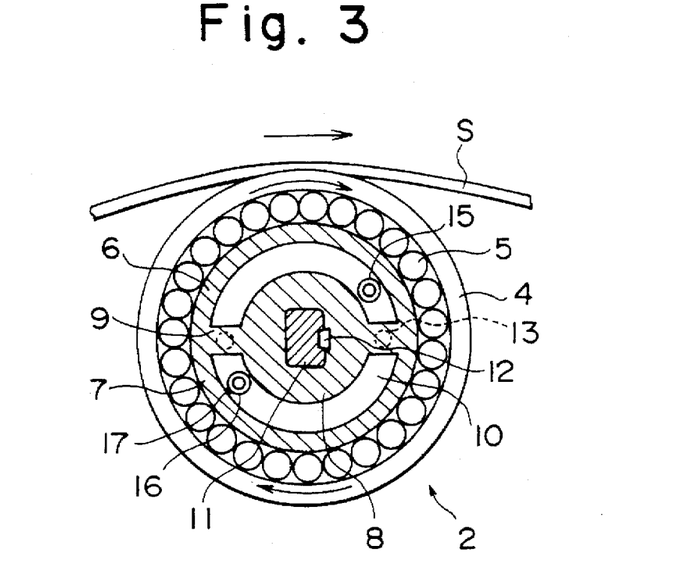
FIG. 3 is an elevational section view of another embodiment of a measurement ring of the shape detecting apparatus of the present invention.
Figure 4:
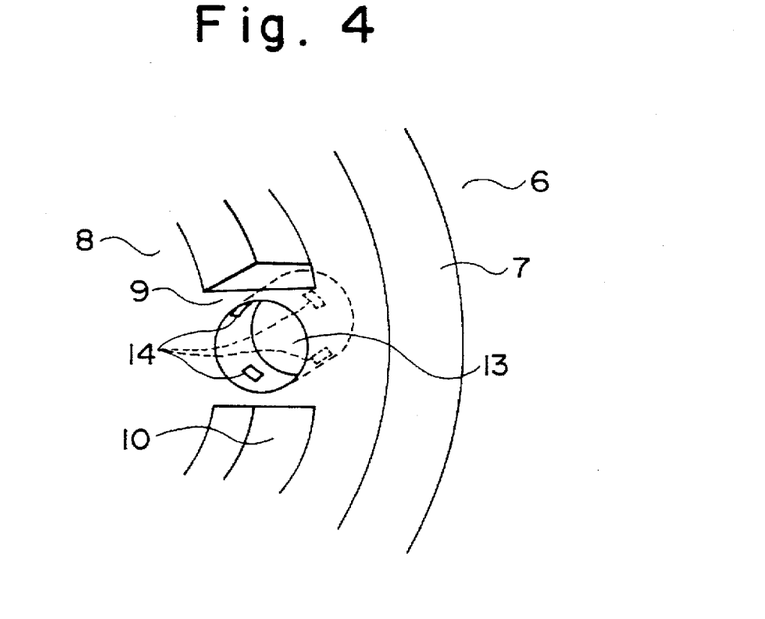
FIG. 4 is a expanded view of a cell portion of a measurement ring of the present invention as illustrated in FIG. 3.

FIGS. 1, 2, 3, and 4 illustrate a structure of a shape detecting apparatus 1 of the present invention. FIG. 2 illustrates a configuration of a measurement ring 2 of a first embodiment. FIG. 3 illustrates a configuration of another embodiment of measurement ring 2, and FIG. 4 illustrates a partially expanded diagram of FIG. 3.

FIG. 2 is a sectional configuration diagram of the measurement ring 2 viewed from a front. The measurement ring 2 has a structure having a cylindrical load cell 6 fixed to a fixed shaft 11, a bearing 5 arranged around its outer circumference, and an outer ring 4 integrated further around its outer circumference as an external ring to rotate freely. The load cell 6 comprises a floating inner ring 7 which shapes an outer circumference portion, a fixed inner ring 8 which shapes an inner circumference portion to be fixed to the fixed shaft 11 with a key 12, cell portions 9 for connecting the floating inner ring 7 to the fixed inner ring 8, and a hollow portion 10. The cell portions 9 are disposed between the floating inner ring 7 and the fixed inner ring 8, and symmetrically to the fixed shaft 11 which is inserted between the cell portions 9, being fixed with caulking or by using keys at ends of the fixed inner ring 8. In addition, the cell portions 9 have a load measuring means. Further, the cell portions 9 include a gauge insertion port 13, in which a strain gauge, serving as the load measurement means, is housed. The insertion port 13 is sealed with an inert gas such as $N_2$. In the hollow portion 10, an air inlet tube 15 and an oil mist inlet tube 16 are arranged in parallel with the fixed shaft 11 to blow a cooled air to the outside of the cell portions 9 and an oil mist to the bearing 5, respectively.

FIG. 3 is a sectional configuration diagram viewed from the front, illustrating another embodiment of the measurement ring 2, and FIG. 4 is a partially expanded diagram of FIG. 3.

Although a configuration of the measurement ring 2 shown in FIG. 3 is basically the same as the measurement ring 2 shown in FIG. 2, a structure of the cell portions 9 is not identical. Specifically, instead of the independent cell portions 9 as illustrated in FIG. 3, the floating inner ring 7, the fixed inner ring 8, and the cell portion 9 are integrated into a single structure having hollow portion 10. As illustrated in FIG. 4, the cell portion 9 has a gauge insertion port 13; a strain gauge 14 is put in the gauge insertion port 13 and then an inert gas is entered into it and sealed with a lid. The lid is fixed with welding. In the hollow portion 10, an air inlet tube 15 and an oil mist inlet tube 16 are arranged in parallel with a fixed shaft 11 to blow a cooled air to the outside of the cell portion 9 and an oil mist to a bearing 5, respectively.

The shape detecting apparatus of this invention has the above structure and therefore it is resistant to a bad environment such as a high temperature or humidity, so that it is optimum for measuring, particularly a shape of a strip at a high temperature such as a hot rolled strip.

FIG. 1 shows an entire structure of the shape detecting apparatus into which measurement rings 2 are integrated according to the present invention. To connect the adjacent measurement rings 2, the measurement rings 2 shown in FIG. 2 are sequentially put around the straight fixed shaft 11 being fixed with a key 12 so as to obtain a shape measurement roll 3 integrated as a whole. Load detection outputs from each measurement ring 2 are fetched to the outside through the hollow portion 10 which is inside the measurement rings 2 and they are subjected to signal processing to obtain a tension distribution in the strip width direction.

Figure 5:
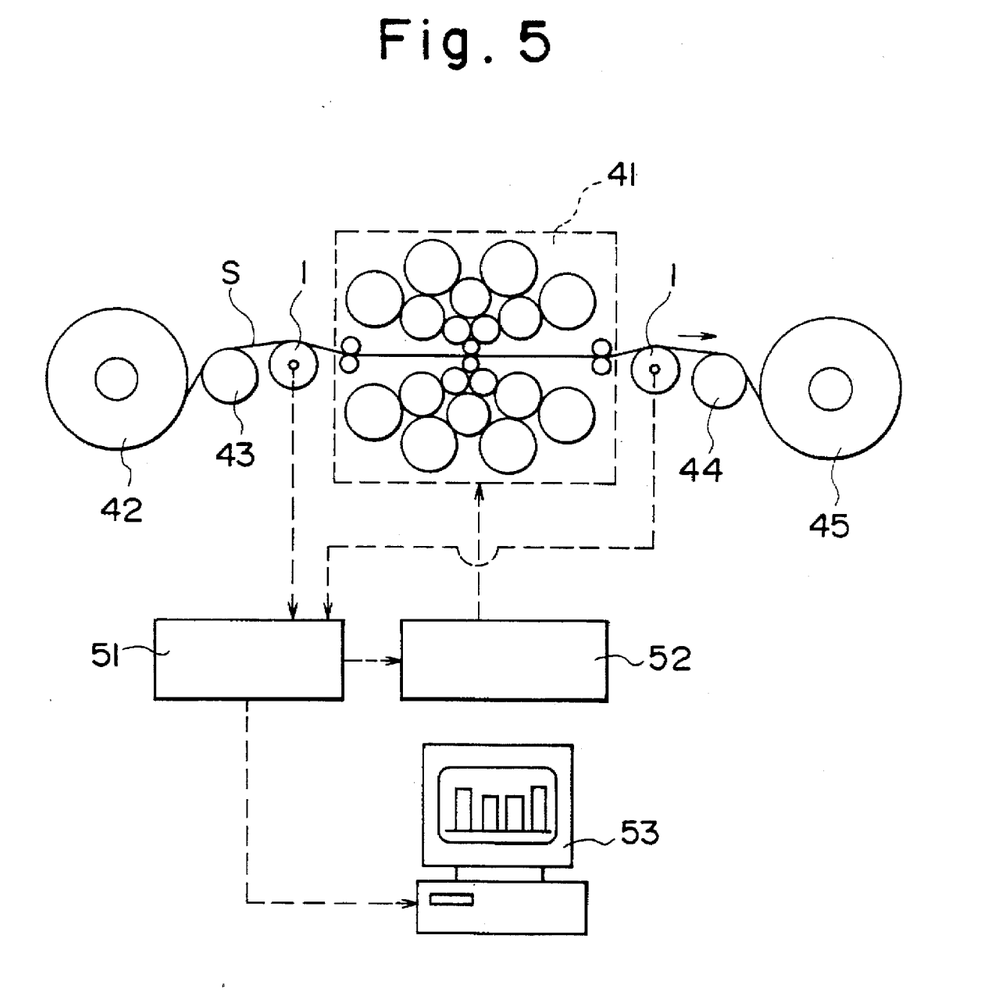
FIG. 5 is a block diagram of an embodiment of a rolling mill including which a shape detecting apparatus of the present invention.

FIG. 5 shows an example of using a shape detecting apparatus 1 of the present invention for a Sendzimir mill 41 for rolling a strip S wound around winders 42 and 45. The shape detecting apparatus 1, each having a measurement roll 3 with ten measurement rings 2 having an outer diameter of 352 mm and a width of 140 mm fitted to the fixed shaft 11 in the width direction, are set in input and output sides of the mill, respectively. Although the shape detecting apparatuses 1 are arranged beside deflection rolls 43 and 44 for winding coils in this example, naturally it is possible to use them also as deflection rolls 43 and 44. By using the shape detecting apparatuses of this invention, freedom of an outer diameter or a width of the measurement rings is significantly increased compared with divided rolls of the conventional apparatuses, and it becomes possible to make measurement rings having a small outer diameter of approx. 100 mm or a width of 200 mm. Accordingly, a tension distribution measuring density in the strip width direction can be arbitrarily changed within a range of 25 to 200 mm.

Figure 6:
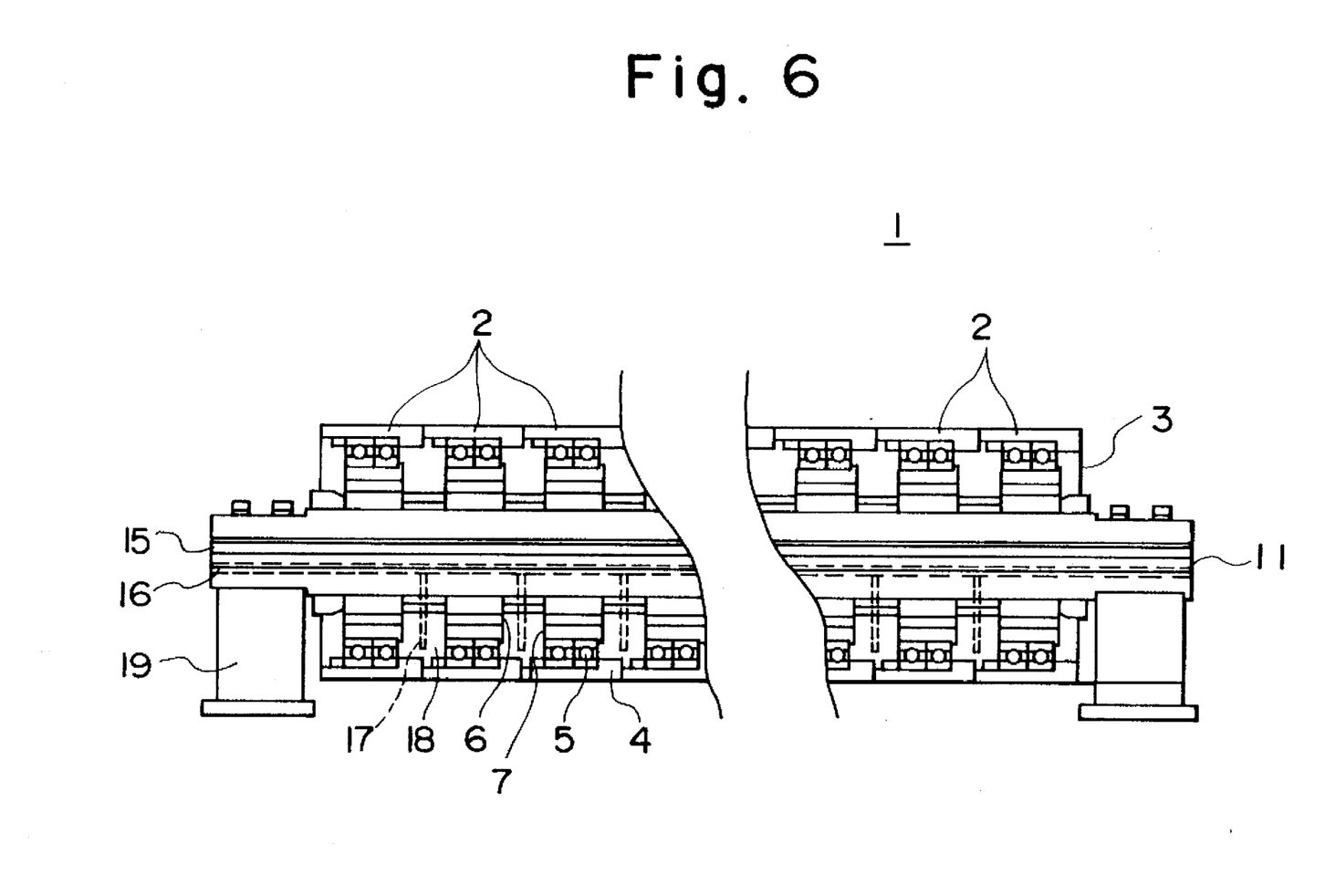
FIG. 6 is a sectional side view of an embodiment of the shape detecting apparatus of the present invention.

FIG. 6 is a sectional side view of the shape detecting apparatus of the embodiment shown in FIG. 5, illustrating a state that the shape detecting apparatuses of this invention shown in FIG. 1 at the back and front of the mill 41 being put on rests 19.

The air inlet tube 15 and the oil mist inlet tube 16 run through the hollow portion 10 formed inside the measurement rings 2 in parallel with the fixed shaft 11 from an end of the measurement roll 3 of the shape detecting apparatus 1. Many air blow-off ports are provided around the air inlet tube 15 so as to supply a high-pressure air for cooling in and about the hollow portion 10 from the ports. In addition, an oil mist for lubrication is blown into the bearing 5 from spray nozzles 17 connected to the oil mist inlet tube 16 in spaces 18 generated by different widths between the outer rings 4 of the measurement rings 2 and the floating inner rings 7. This blowing cools the strain gauge and the floating inner rings 7 and lubricates the bearing 5. Furthermore, the shape detecting apparatus 1 does not require any driving motor such as a conventional one since it has an outer ring 4 rotating freely via balls as an external ring for each measurement ring 2.

Load detecting outputs from respective measurement rings are fetched to the outside from ends of the shape detecting apparatuses 1 and then entered into a signal processing unit 51. Then, a tension distribution in the strip width direction is obtained by calculating the outputs and displayed on a display unit 53. If a shape is controlled, an output from the signal processing unit 51 is transmitted to a pressure control unit 52 to calculate an operation output of the mill and then a pressure regulation in the strip width direction is performed by using a Sendzimir mill 41.

This invention has the following effects:

Firstly, it is possible to detect a shape at a high temperature. Since the entire apparatus is a load cell structure, a load detector is not directly brought into contact with a strip unlike the conventional shape detecting apparatuses.

Furthermore, it becomes possible to detect a shape of a strip at a 250° C. or higher temperature, in other words, a hot rolled strip by putting a strain gauge in the central portion of a load cell sealed by using an inert gas such as $N_2$, arranging it in the central portion of an inner ring of a bearing, and then cooling the outside of the cell by using a cooling gas.

Secondly, it has a simple structure. Since the entire inner ring is a load cell structure, it is unnecessary to remove a load fluctuation caused by a thermal expansion and a shape can be detected stably in a simple structure. Furthermore, since a diameter and a width of the measurement rings can be significantly changed compared with the conventional ones, it becomes possible to install a shape detecting apparatus also in a small space where conventionally it has been impossible and the number of combined measurement rings can be changed; hence it becomes possible to make a shape detecting apparatus having a required resolution.

Thirdly, it is available at a low cost. Outputs from the detecting apparatus are continuous and a signal processing circuit is not complicated unlike the conventional ones. In addition, outputs from the detecting apparatus can be fetched from spatially-fixed inner rings and therefore a slip ring like a conventional one is not needed so as to have good maintainability. Further, since an outer ring having balls is arranged as an external ring for each measurement ring, a driving motor like a conventional one is not needed. Therefore, it is possible to make a shape detecting apparatus which causes little failures at a greatly low cost compared with the conventional ones.

What is claimed is:

1. A strip shape detecting apparatus comprising:

a measurement ring comprising:

- a load cell fixed about a fixed shaft, wherein the load cell comprises a floating inner ring defining an outer circumference portion of the load cell, a fixed inner ring defining an inner circumference portion of the load cell and a cell portion connecting the floating inner ring and the fixed inner ring, the cell portion including a housing for housing a load measuring device;
- a cylindrical sleeve arranged about the outer circumference of the load cell, wherein the cylindrical sleeve rotates freely about the load cell; and
- a bearing arrangement between the load cell and the cylindrical sleeve.

2. A strip shape detecting apparatus as recited in claim 1, further comprising a plurality of the measurement rings axially arranged in a row along the fixed shaft, wherein the fixed shaft is arranged in a direction perpendicular to a direction of travel of a measurable strip.

3. A strip shape detecting apparatus as recited in claim 1, wherein the load measuring means is a strain gauge and the housing is supplied with an inert gas and sealed.

4. A strip shape detecting apparatus as recited in claim 1, wherein the outer circumference and the inner circumference define a hollow portion and wherein cooling means are arranged in the hollow portion.

* * * * *